(12) United States Patent
Crotty, III et al.

(10) Patent No.: US 6,926,336 B1
(45) Date of Patent: Aug. 9, 2005

(54) SUN VISOR ASSEMBLY

(75) Inventors: Willard E. Crotty, III, Quincy, MI (US); Keith R. Boyle, Hillsdale, MI (US)

(73) Assignee: Crotty Corporation, Quincy, MI (US)

(*) Notice: Subject to any disclaimer, the term of this patent is extended or adjusted under 35 U.S.C. 154(b) by 0 days.

(21) Appl. No.: 10/776,082

(22) Filed: Feb. 11, 2004

Related U.S. Application Data

(60) Provisional application No. 60/446,503, filed on Feb. 11, 2003.

(51) Int. Cl.$^7$ ................................................ B60J 3/00
(52) U.S. Cl. .................... 296/97.1; 296/97.5; 296/97.2
(58) Field of Search ............................ 296/97.1, 97.5, 296/97.9, 97.12, 97.11, 97.8, 97.2, 97.13, 296/97.7

(56) References Cited

U.S. PATENT DOCUMENTS

| | | | | |
|---|---|---|---|---|
| 4,384,740 A | * | 5/1983 | Marrotta ..................... 296/97.1 |
| 4,477,116 A | * | 10/1984 | Viertel et al. ............... 296/97.1 |
| 4,792,176 A | * | 12/1988 | Karford ....................... 296/97.8 |
| 4,810,023 A | * | 3/1989 | Kawada ....................... 296/97.8 |
| 4,858,983 A | * | 8/1989 | White et al. ................ 296/97.1 |
| 4,921,300 A | * | 5/1990 | Lawassani et al. ........ 296/97.11 |
| 4,982,991 A | * | 1/1991 | Lawassani et al. ......... 296/97.1 |
| 4,998,767 A | * | 3/1991 | Lawassani et al. ......... 296/97.1 |
| 5,205,639 A | * | 4/1993 | White et al. ................ 296/97.2 |
| 5,209,880 A | * | 5/1993 | Miwa .......................... 264/445 |
| 5,365,416 A | * | 11/1994 | Peterson ..................... 296/97.5 |
| 5,475,573 A | * | 12/1995 | White ......................... 296/97.5 |
| 5,580,118 A | * | 12/1996 | Crotty, III .................. 296/97.1 |
| 5,678,879 A | * | 10/1997 | Mailander et al. ......... 296/97.1 |
| 5,887,933 A | * | 3/1999 | Peterson ..................... 296/97.1 |
| 5,951,090 A | * | 9/1999 | Wilson et al. .............. 296/97.1 |
| 5,951,091 A | * | 9/1999 | VanderKuyl et al. ...... 296/97.8 |
| 6,042,172 A | * | 3/2000 | Murdock .................. 296/97.12 |
| 6,199,934 B1 | * | 3/2001 | Sturt .......................... 296/97.1 |
| 6,254,168 B1 | * | 7/2001 | Crotty, III .................. 296/97.1 |
| 6,302,467 B1 | * | 10/2001 | Crotty et al. ............... 296/97.1 |
| 6,367,861 B1 | * | 4/2002 | Crotty et al. ............... 296/97.1 |
| 6,409,245 B1 | * | 6/2002 | Crotty et al. ............... 296/97.1 |
| 6,557,920 B1 | * | 5/2003 | Hobson et al. ............. 296/97.1 |
| 6,578,895 B1 | * | 6/2003 | Tom ........................... 296/97.1 |
| 6,598,928 B1 | * | 7/2003 | Drake et al. ................ 296/97.1 |
| 6,612,637 B1 | * | 9/2003 | Crotty, III .................. 296/97.1 |
| 6,634,696 B1 | * | 10/2003 | Tiesler ....................... 296/97.1 |
| 6,641,197 B1 | * | 11/2003 | Hobson et al. ............. 296/97.1 |
| 6,669,262 B1 | * | 12/2003 | Crotty et al. ............... 296/97.1 |
| 6,824,188 B1 | * | 11/2004 | Brown et al. ............... 296/97.1 |

* cited by examiner

*Primary Examiner*—Kiran B. Patel
(74) *Attorney, Agent, or Firm*—Rader, Fishman & Grauer, PLLC

(57) ABSTRACT

A sun visor assembly is provided that includes a core member, a foundation extending over the core member, and a cover extending over the foundation and forming an outer surface of the sun visor assembly. In an embodiment, the core member includes a plate having at its upper edge a hinge portion and at its lower edge a rounded bead. The core member may also be corrugated to include one or more peaks and troughs.

8 Claims, 3 Drawing Sheets

SUN VISOR ASSEMBLY

CROSS REFERENCE TO RELATED APPLICATIONS

This application claims priority to U.S. provisional application 60/446,503 filed on Feb. 11, 2003, which is incorporated herein by reference in its entirety.

BACKGROUND OF THE INVENTION

1. Field of the Invention

The present invention relates to the field of sun visors for use in vehicles and, more particularly, to sun visors having an improved core member.

2. Description of the Related Art

It is well known to provide a sun visor for the windshield of a vehicle, wherein the sun visor is mounted on a roof panel of the vehicle for movement between a stored position adjacent the vehicle headliner, a first use position adjacent the windshield and a second use position adjacent a side-door window opening. In a typical sun visor assembly, a sun visor body is provided that includes an outer cover assembly, which folds unto itself and sandwiches a core member therebetween. The outer cover assembly is made of a cloth or vinyl upholstery covering, which is adhesively bonded to a semi-rigid foundation, typically made of kraft paper or other lightweight material. The core member is disposed between the foundation halves and connects to a support rod, which in turn connects to the interior headliner of the vehicle.

The core member of the sun visor is generally the main support structure of the visor, providing the rigidity needed to prevent bending or undesirable flexing of the sun visor during use. Because of these structural requirements, the core member of a conventional sun visor is typically the most structurally complex and costly component in the sun visor. Accordingly, a need exists for a more cost effective core member design that doesn't sacrifice the structure needed to inhibit bending or flexing of the sun visor as it is moved from the stored position to one of the use positions.

SUMMARY OF THE INVENTION

A sun visor assembly is provided that includes a core member, a foundation extending over the core member, and a cover extending over the foundation and forming an outer surface of the sun visor assembly. In an embodiment, the core member includes a plate having at its upper edge a hinge portion and at its lower edge a rounded bead. The core member may also be corrugated to include one or more peaks and troughs.

BRIEF DESCRIPTION OF THE DRAWINGS

Embodiments of the invention will now be described, by way of example, with reference to the accompanying drawings, wherein.

DETAILED DESCRIPTION

Figure 1:
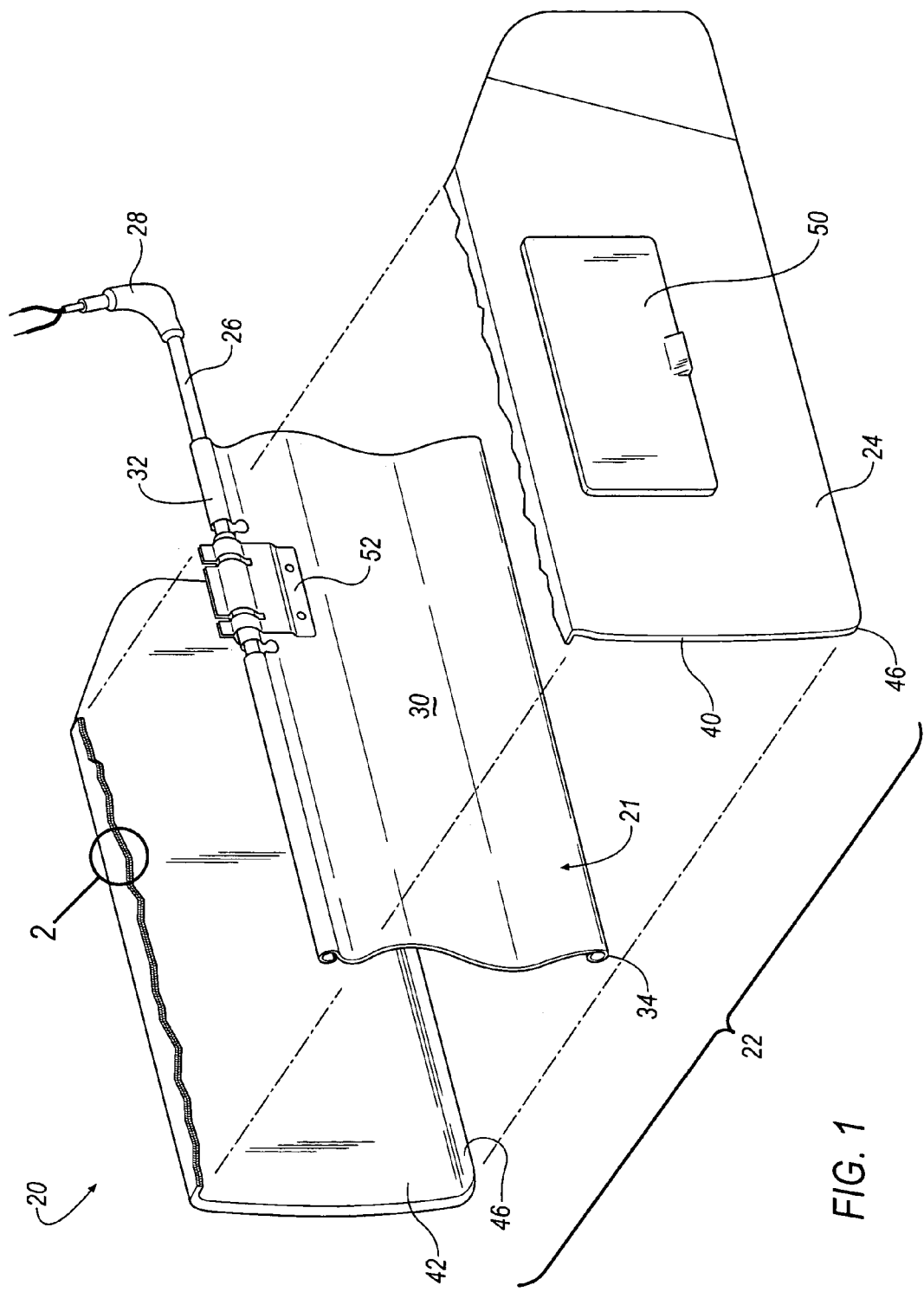
FIG. 1 is an exploded perspective view of a sun visor assembly employing the core member according to an embodiment of the present invention.
Figure 3:
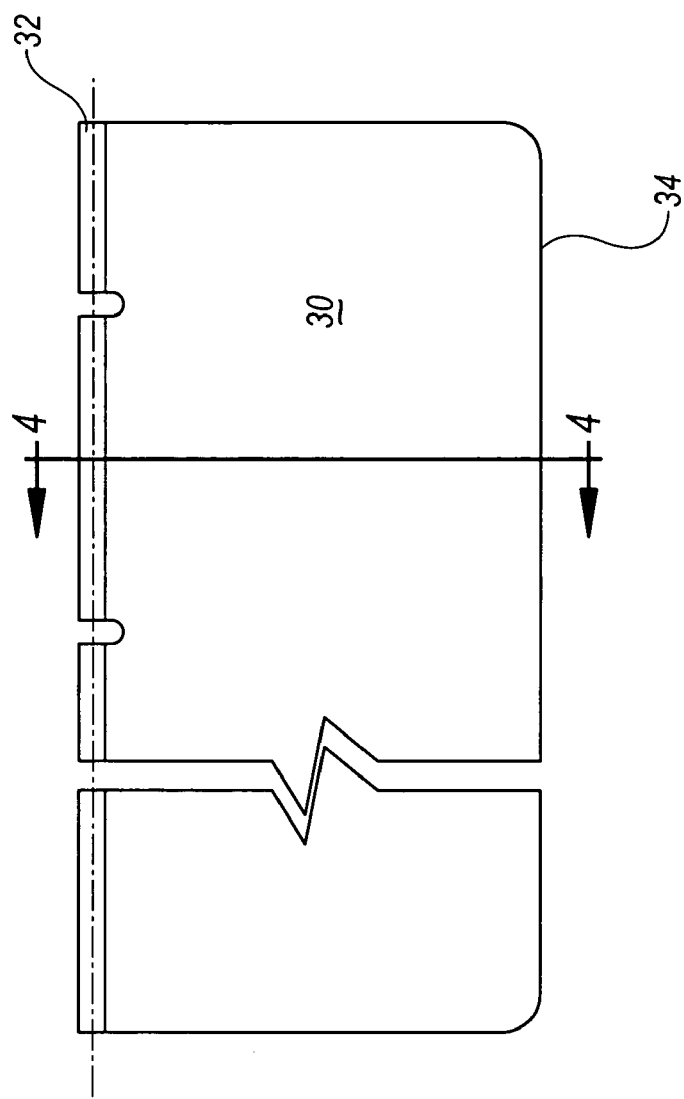
FIG. 3 is a front elevation view of the core member according to an embodiment of the present invention.
Figure 2:
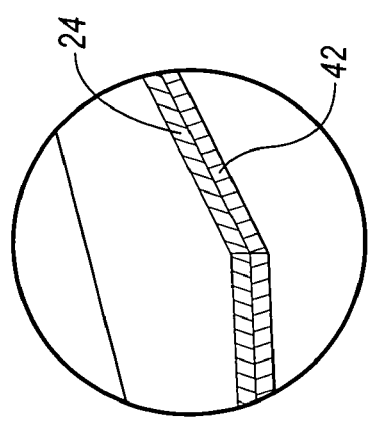
FIG. 2 is a detailed view of the foundation shown in FIG. 1.

Referring to FIG. 1, a sun visor 20 is shown according to an embodiment of the present invention. In the illustrated embodiment, sun visor 20 includes a core member 21, a foundation 22 surrounding core member 21, a cover material 24 that surrounds foundation 22 and a visor pivot rod 26 attached to core member 21 for pivoting the sun visor 20 between a "stored" position adjacent an interior headliner of a vehicle and a "use" position adjacent a vehicle windshield. A sun visor mounting member 28 cooperates with one or more mounting bracket components (none shown) to secure sun visor 20 to the vehicle roof and/or vehicle headliner and permits sun visor 20 to be pivoted about a substantially vertical axis from a position proximate the vehicle windshield to a position proximate a vehicle side window.

Referring to embodiment shown in FIGS. 1 and 3–6, core member 21 includes a relatively thin metal plate 30, such as steel or aluminum, which is stamped, cast or roll formed into the desired shaped. While metal is the most desirable material given its relatively high structural integrity and relatively low cost, other materials, such as plastics, may also be used in core member 21. Further, the method of manufacturing core member 21 is not necessarily limited to stamping, casting or roll forming. Indeed, core member 21 may be made by die casting or injection molding, with the latter being particularly suited for a plastic core member 21.

In the illustrated embodiment, plate 30 includes an integral hinge portion 32 at its upper edge and an integral rounded bead 34 at its lower edge. While plate 30 is illustrated and described as having a rounded bead at its lower edge, it is not limited thereto. Alternatively, plate 30 may terminate into a straight edge, as shown in FIG. 5B, or other geometry suitable for supporting foundation 22 of sun visor 20.

Figure 6:
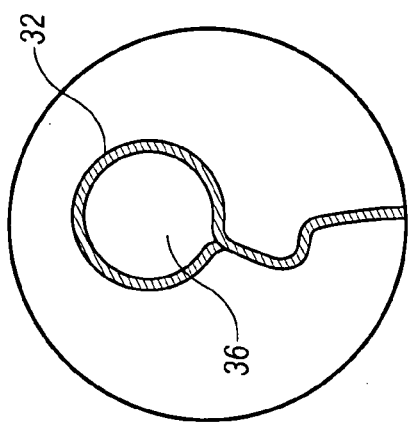
FIG. 6 is a detailed cross-section view of an upper edge of the core member according to an embodiment of the present invention.
Figure 4:
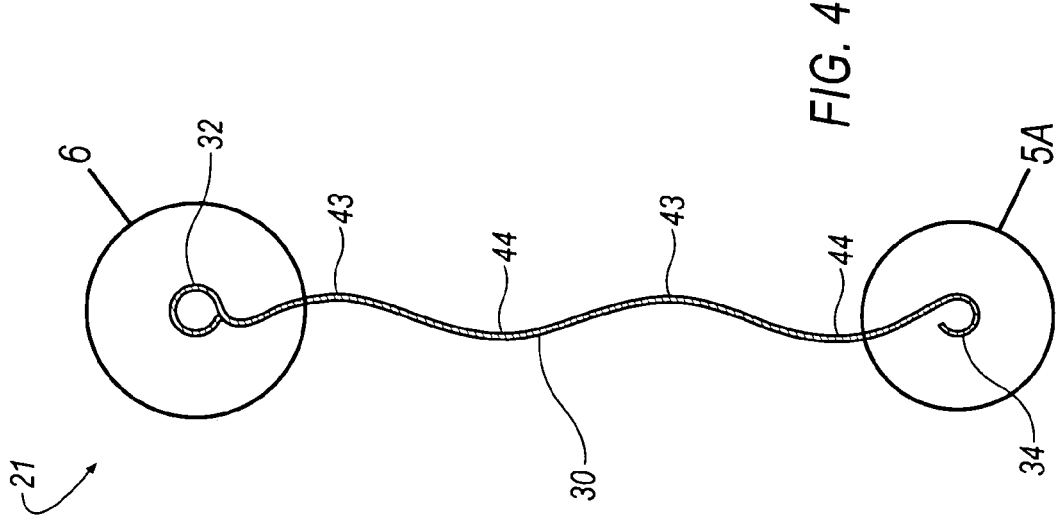
FIG. 4 is a cross-section view of the core member according to an embodiment of the present invention.

As shown in FIGS. 4 and 6, hinge portion 32 may be made by rolling the upper portion of plate 30 unto itself to form a generally cylindrical channel 36, particularly when plate 30 is made from metal. In a particular configuration, channel 36 extends substantially the entire length of plate 30 and is sized to receive visor pivot rod 26.

Figure 5A:
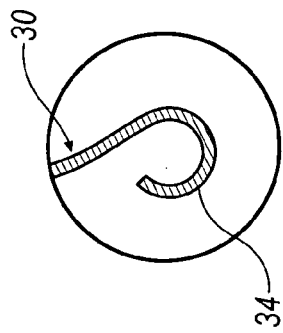
FIG. 5A is a detailed cross-section view of a lower edge of the core member according to an embodiment of the present invention.
Figure 5B:
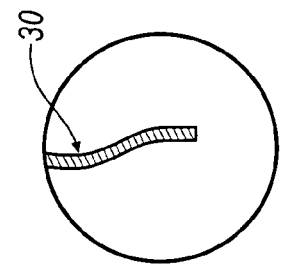
FIG. 5B is a detailed cross-section view of a lower edge of the core member according to another embodiment of the present invention.

As shown in FIGS. 4 and 5A, rounded bead 34 may be made by rolling the lower portion of plate 30 unto itself to create a rounded edge. Rounded bead 34 may be dimensioned to meet regulations promulgated by international automotive authorities requiring contactable edges of a sun visor to have a radius of not less than about 3.2 mm (0.126 in).

Referring again to embodiment illustrated in FIG. 1, foundation 22 includes a pair of foundation halves 40, 42. Foundation halves 40, 42 may be formed as two discrete components that are secured together over core member 21 or as a single clam-shell like member that is folded unto itself over core member 21 to form the two foundation halves.

To give sun visor 20 a certain fullness and/or provide additional structure, plate 30 may be corrugated or otherwise made to provide one or more pair of cooperating peaks 43 and troughs 44 against which the inner surface of the sun visor foundation 22 abuts. A lower periphery of foundation halves 40, 42 may also include a rounded lip portion 46, preferably having a bend radius of not less than approximately 3.2 mm (0.126 in). When foundation halves 40, 42 are secured together over core member 21, lip portions 46 in each foundation half "mate" to form a rounded edge whose cross-section is substantially semicircular. The term "mate," as used herein, is to be construed broadly to include variations in the way in which lip portions 46 may be aligned with one another in assembled foundation 22. The rounded edge is preferably dimensioned to meet regulations promulgated by international authorities requiring contactable edges of a sun visor to have a radius of not less than about 3.2 mm (0.126 in). The rounded bead 34 at the lower edge of core member 21 is dimensioned to support the lip portion 46 of foundation 22.

Foundation halves 40, 42 may be joined by sewing foundation halves 40 and 42 together, dielectric sealing foundation halves 40 and 42 together, or by employing a non-expanding adhesive disposed about the periphery of foundation 22 intermediate foundation halves 40, 42. Many suitable adhesives are known in the art that can be used to secure foundation halves 40, 42 together, such as Pliogrip® urethane adhesive sold by Ashland Chemical Company. Alternatively, foundation halves 40, 42 may include integrally formed joints (not illustrated) that slide together during assembly or other suitable fasteners known in the art, such as plastic rivets or heat stakes, for securing the foundation halves together.

Cover material 24 may be made from suitable upholstery material, such as vinyl, fabric or cloth with bonded foam backing for example. Cover material 24 may be applied to foundation 22 before foundation is secured over core member 21 or after.

Additional components may be added to the core member 21 and foundation 22, such as, for example, a vanity mirror assembly 50 shown in FIG. 1, or a center support pin, a slide mechanism or a universal garage door opener (none shown). Optionally, a generally U-shaped detent clamp 52 may be secured to plate 30 about a recess (not shown) in hinge portion 32 to surround a portion of support rod 26. Detent clamp 52 may be retained on plate 30 by one or more rivets or other suitable fastening member, such as a bolt or an adhesive. In an embodiment, support rod 26 may include one or more flats (not illustrated) that cooperate with detent clamp 52 to hold/lift the visor in the "stored" position. Hinge portion 32 is pivotable about support rod 26 and the assembled sun visor 22 is pivotable therewith.

Among other benefits, the one-piece core member 21 allows sun visor to be manufactured at a relatively low cost, without sacrificing the structure needed to support foundation 22.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A sun visor assembly, comprising:
   a core member that includes a metal plate having at its upper edge a rolled hinge portion and at its lower edge a rounded bead, the core member being corrugated to include one or more peaks and troughs;
   a foundation extending over the core member; and
   a cover extending over the foundation and forming an outer surface of the sun visor assembly.

2. The sun visor assembly of claim 1, wherein the rounded bead includes a radius of at least about 3.2 mm (0.126 in).

3. The sun visor assembly of claim 1, wherein the hinge portion includes a channel.

4. The sun visor assembly of claim 3, further including a pivot rod received in the channel of the hinge portion.

5. The sun visor assembly of claim 4, further including a detent clamp, the pivot rod adapted to cooperate with the detent clamp to hold or lift the visor in a predetermined position.

6. The sun visor assembly of claim 1, wherein the foundation includes a pair of foundation halves.

7. The sun visor assembly of claim 6, wherein the foundation is folded unto itself to form the foundation halves.

8. The sun visor assembly of claim 6, wherein each foundation half includes a rounded lip portion, the rounded lip portions cooperating to define a rounded edge of the sun visor assembly.

\* \* \* \* \*